United States Patent [19]

Lochmann

[11] Patent Number: 5,065,787
[45] Date of Patent: Nov. 19, 1991

[54] CHOKE VALVE SAFETY DEVICE

[75] Inventor: Bernhard Lochmann, Houston, Tex.

[73] Assignee: FMC Corporation, Chicago, Ill.

[21] Appl. No.: 695,662

[22] Filed: May 3, 1991

[51] Int. Cl.[5] .................. F16K 35/02; F16K 51/00
[52] U.S. Cl. .................... 137/315; 137/312;
  137/382; 166/91; 285/92; 285/924; 411/374;
  411/429; 411/910
[58] Field of Search ............ 70/DIG. 57; 137/312,
  137/315, 377, 381, 382; 166/91; 285/80, 81, 90,
  92, 901, 924; 411/372, 373, 374, 429, 910, 911

[56] References Cited

U.S. PATENT DOCUMENTS

| | | | |
|---|---|---|---|
| 1,814,412 | 7/1931 | Rutter | 285/90 |
| 2,943,869 | 7/1960 | Nordin | 285/90 |
| 3,035,605 | 5/1962 | Ninnelt | 137/382 |
| 3,119,449 | 1/1964 | Price | 137/382 |
| 3,960,047 | 6/1976 | Liffick | 411/429 |
| 4,337,788 | 7/1982 | Seger | 137/315 |
| 4,503,878 | 3/1985 | Taylor | 137/315 |
| 4,705,062 | 11/1987 | Baker | 166/91 |
| 4,921,281 | 5/1990 | Taylor | 285/90 |
| 4,923,221 | 5/1990 | Taylor | 285/81 |
| 4,926,898 | 5/1990 | Sampey | 137/315 |

FOREIGN PATENT DOCUMENTS

| | | | |
|---|---|---|---|
| 616091 | 1/1949 | United Kingdom | 137/382 |
| 909820 | 11/1962 | United Kingdom | 137/382 |

Primary Examiner—George L. Walton
Attorney, Agent, or Firm—W. William Ritt, Jr.; Richard B. Megley

[57] ABSTRACT

A choke valve safety device to prevent unthreading of the choke bonnet nut until internal pressure has been vented, comprising a U-shaped bracket that fits over a tool-engaging portion of the nut, and a bracket support securable to the choke body only in the correct position.

6 Claims, 1 Drawing Sheet

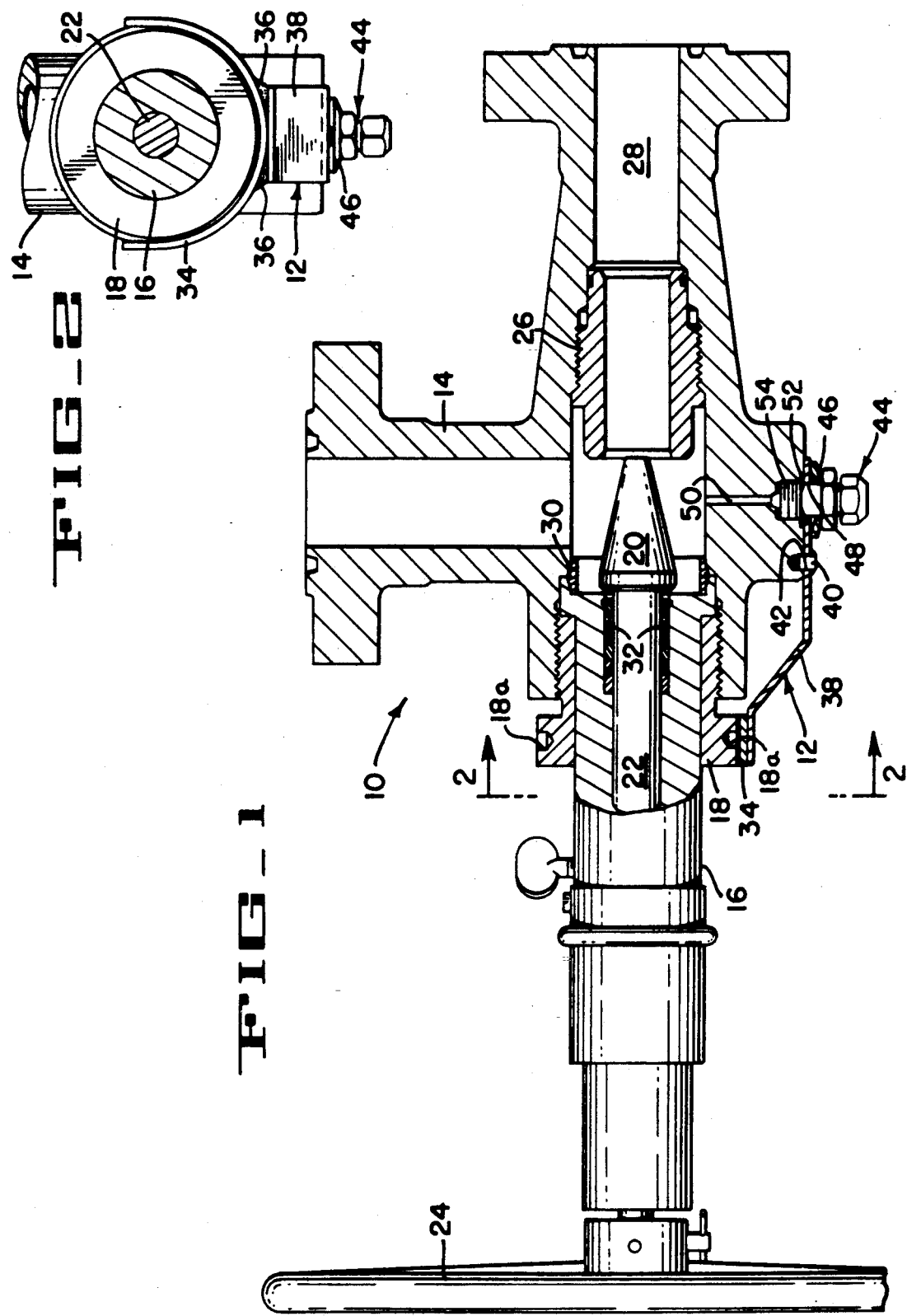

CHOKE VALVE SAFETY DEVICE

BACKGROUND OF THE INVENTION

This invention relates to choke valves, and more particularly to safety devices for such valves to prevent injury to personnel during servicing procedures.

Chokes are special flow control valves commonly used in the petroleum industry to regulate oil production and drilling fluid injection. Because of the high pressures encountered in those operations it is very important that the chokes can be disassembled safely in the field when their servicing, such as to replace packings, seats of other worn out components, is necessary.

SUMMARY OF THE INVENTION

The present invention provides a choke valve safety device that insures the safety of service personnel by preventing unthreading of the choke bonnet nut, and thus further disassembly of the choke, until pressure in the choke has been vented. The safety device comprises a generally U-shaped cover bracket that fits against the bonnet nut and prevents tool access for unthreading the nut from the choke body, and a plate bracket extending from and supporting the cover bracket. The plate bracket is designed to cooperate with a positioning pin on the choke body so that the safety device can be installed only in the correct position. The safety device is fastened to the choke body by a bleeder fitting that extends through and is doubly secured to the plate bracket by a retaining ring and a drop out thread, thereby preventing accidental separation of the bleeder fitting from the safety device after their removal from the choke. The bleeder fitting exerts a clamping force on the plate bracket through a Belleville washer, and the plug of the fitting seats on the floating cone of the fitting located between the plug and the choke body, thereby avoiding the problems resulting from accumulation of manufacturing tolerances that would prevent achievement of metal-to-metal contact simultaneously at two locations.

The foregoing and other advantages of the present invention will become apparent from the following description in combination with the accompanying drawings.

BRIEF DESCRIPTION OF THE DRAWINGS

FIG. 1 is a side elevation, with a portion in central longitudinal section, of a choke valve with a safety device according to the present invention.

FIG. 2 is a view taken along the line 2—2 of FIG. 1.

DESCRIPTION OF THE PREFERRED EMBODIMENT

A choke valve 10 with a safety device 12 in accordance with the present invention comprises generally a valve body 14, a bonnet 16 held in position in the body 14 by a bonnet nut 18 threaded into the body, a flow regulating valve element 20 on a stem 22 rotatable by a hand wheel 24, and a sleeve-like seat 26 for cooperation with the valve elememt 20 to control fluid flow through a valve flow passage 28. An annular seal element 30 provides a static pressure-tight seal between the body 14 and bonnet 16, and an annular stem packing 32 provides a dynamic pressure-tight seal between the bonnet 16 and the stem 22. In order to service the choke valve 10 the bonnet 16 must be withdrawn from the body 14, and this necessitates unthreading the bonnet nut 18 from the body, a procedure that can be safely performed only after the pressure in the valve passage 28 has been vented. The bonnet nut 18 is unthreaded by means of a tool (not shown) that fits into a pair of radially oriented receptacles 18a in the outer surface of the nut.

To assure that disassembly of the choke 10 is not commenced until it is vented, the safety device 12 comprises a generally U-shaped bonnet nut cover bracket 34 secured by welds 36 to an elongated support bracket 38. The safety device 12 is positioned on the choke body 14 so that the bracket 34 resides against the bonnet nut 18 and covers at least half of the nut circumference where the nut removal tool fits, and a positioning pin 40 fixed to and protruding from the body 14 resides in a hole 42 in the bracket 38. The safety device 12 is held in position by a bleeder fitting 44 and a Belleville washer 46, the fitting extending through another hole 48 in the bracket 38 and into threaded engagement with the choke body 14 where it seals a port 50 communicating with the choke flow passage 28. The bleeder fitting is doubly secured to the bracket 38 by a Spirolox retaining ring 54 and by a drop put thread 52, thus preventing accidental separation of the fitting from the bracket after removal of the safety device 12 from the choke body 14.

Accordingly, the bonnet nut 18 cannot be unthreaded from the choke body 14 until the safety device 12 is removed from the body, and such removal cannot be accomplished until the bleeder fitting 44 is unthreaded from the body 14. As unthreading of the bleeder fitting occurs, any pressure in the choke passage 28 will become apparent through the port 50, thereby warning the service person that it is unsafe to proceed with disassembly of the choke until that pressure is completely vented.

Although the best mode contemplated for carrying out the present invention has been herein shown and described, it will be apparent that modification and variation may be without departing from what is regarded to be the subject matter of the invention.

What is claimed is:

1. A safety device for use with a choke valve to prevent disassembly of the valve until fluid pressure therein has been vented, said safety device comprising
   a) a cover bracket overlying a tool engaging portion of a choke valve bonnet nut for preventing access to said choke valve bonnet nut by a nut removal tool;
   b) a plate bracket attached to said cover bracket for supporting the cover bracket on a choke valve body;
   c) alignment means being disposed on said choke valve body for properly positioning the safety device on the choke valve body; and
   d) vent means being disposed on said choke valve body for releasably securing the safety device to the choke body.

2. A safety device according to claim 1 wherein the cover bracket is generally U-shaped and resides in a close-fitting relationship with the bonnet nut when the safety device is properly positioned on the choke body.

3. A safety device according to claim 1 wherein the safety device positioning means comprises a positioning pin secured to and protruding from the choke body, and a hole in the plate bracket that cooperates with said pin.

4. A safety device according to claim 1 wherein the vent means for securing the safety device to the choke body comprises a bleeder fitting extending through the plate bracket and positioned thereon to threadedly engage a pressure port in said choke body.

5. A safety device according to claim 4 wherein the bleeder fitting is secured to the plate bracket against accidental separation therefrom by a Spirolox ring and a drop out thread.

6. A safety device according to claim 4 including a Belleville washer between the bleeder fitting and the plate bracket for securing the safety device tightly to the choke body.

* * * * *

UNITED STATES PATENT AND TRADEMARK OFFICE
CERTIFICATE OF CORRECTION

PATENT NO.   : 5,065,787
DATED        : November 19, 1991
INVENTOR(S)  : Bernhard Lochmann It is certified that error appears in the above-identified patent and that said Letters Patent is hereby corrected as shown below:

Title page, item (21) should read--695,622--.

Signed and Sealed this

Thirteenth Day of April, 1993

*Attest:*

STEPHEN G. KUNIN

*Attesting Officer*   *Acting Commissioner of Patents and Trademarks*